United States Patent
Clement

[15] 3,694,067
[45] Sept. 26, 1972

[54] PRODUCTION AND REPRODUCTION SYSTEMS WITH ENDLESS FILM OR TAPE CARTRIDGE

[72] Inventor: Carl J. Clement, Palo Alto, Calif.

[73] Assignee: The Woodson Enterprises, Inc. c/o Becker and Savin, Chicago, Ill.

[22] Filed: Oct. 27, 1969

[21] Appl. No.: 869,772

[52] U.S. Cl. .................................353/78, 353/26
[51] Int. Cl. .......................G03b 21/28, G03b 23/17
[58] Field of Search .........353/74, 95, 26; 242/55.18, 242/51.19 A; 352/72, 78, 128

[56] References Cited

UNITED STATES PATENTS

| | | | |
|---|---|---|---|
| 1,987,710 | 1/1935 | Robbins | 353/46 |
| 3,446,551 | 5/1969 | Platt | 352/72 |
| 2,975,988 | 3/1961 | Galluzzi | 352/78 |
| 2,311,204 | 2/1943 | Bouma | 352/128 |
| 3,271,096 | 9/1966 | Blackmore | 353/75 |
| 2,576,586 | 11/1951 | Frankel | 353/81 |

FOREIGN PATENTS OR APPLICATIONS

| | | | |
|---|---|---|---|
| 1,368,934 | 6/1964 | France | 242/55.19 A |

Primary Examiner—Leonard Forman
Assistant Examiner—A. J. Mirabito
Attorney—Jerald E. Rosenblum and Warren M. Becker

[57] ABSTRACT

A camera, projector, viewer, sound recording or reproducing system using a continuous film or tape cartridge permitting such systems to be made with as few as one or two moving parts and which can be made by simple molding or die casting techniques. In an optical system, the film cartridge comprises a rotor and a stator which includes the means for driving the film and prism in synchronism. In a viewer, light is projected externally from a source within the viewer, through the film, an aperture in a centrally disposed interior surface of the stator and back into the viewer proper to a frosted screen for viewing. The cartridge permits manual or motor driven motion of the film in either a forward or a reverse direction and the central location of the aperture permits cartridges of relatively unlimited film capacity.

2 Claims, 9 Drawing Figures

PATENTED SEP 26 1972 3,694,067
SHEET 1 OF 3
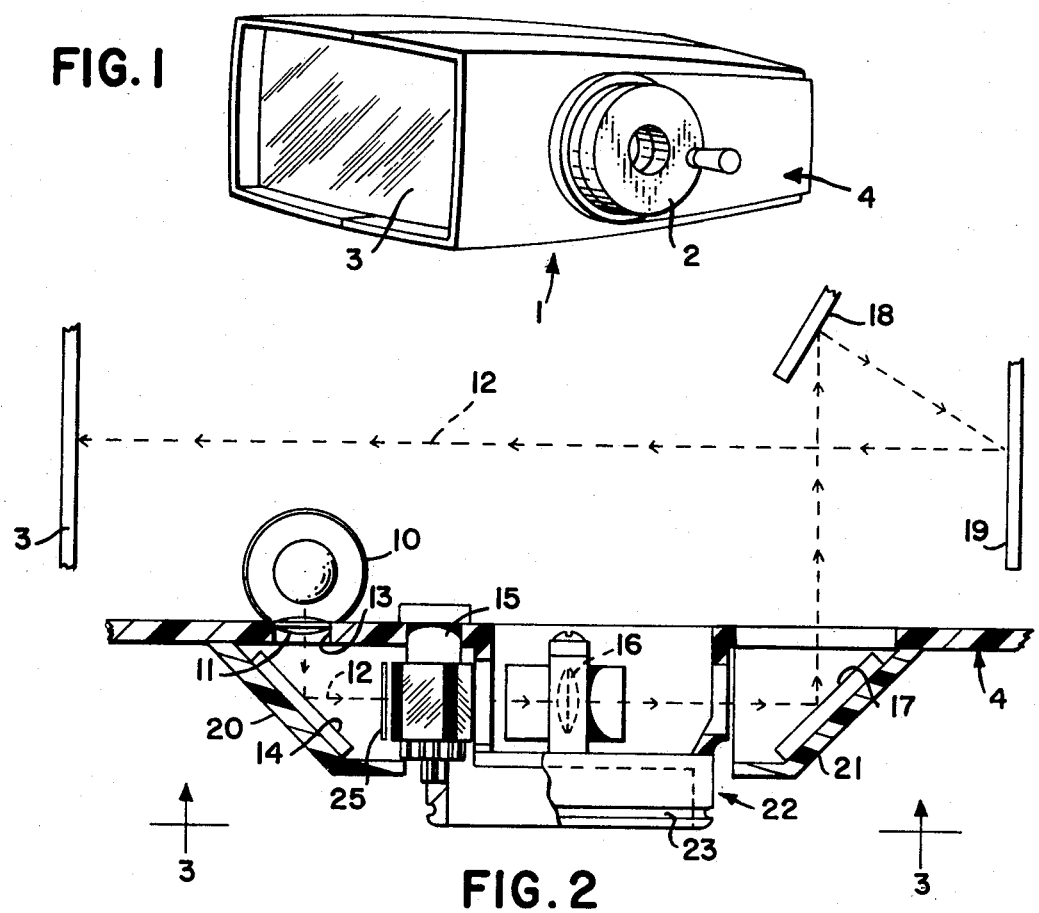
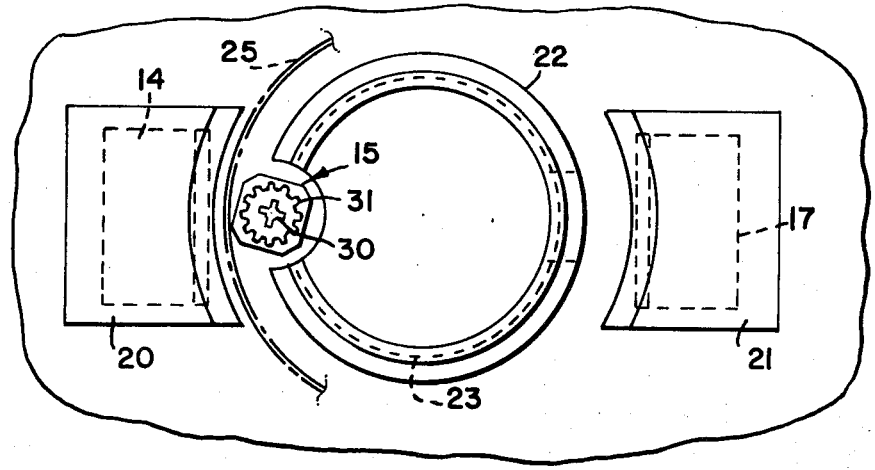
INVENTOR.
CARL J. CLEMENT
BY
ATTORNEYS

INVENTOR.
CARL J. CLEMENT
BY
ATTORNEYS

LEVEL A FROM "O" = .750
LEVEL B FROM "O" = .335
LEVEL C FROM "O" = .168
LEVEL E FROM "O" = .084
LEVEL F FROM "O" = .395

3,694,067

PRODUCTION AND REPRODUCTION SYSTEMS WITH ENDLESS FILM OR TAPE CARTRIDGE

BACKGROUND OF THE INVENTION

A number of continuous film strip and magnetic tape cartridges are known which have found varied and extensive use in sound and optical reproduction and projection systems. In both types of systems, the film is generally driven by some external means in the projector or sound reproduction system such as a complex gear or drive wheel assembly which engages corresponding exposed portions of the film or tape to drive the film or tape past a reading head or viewing aperture. In the optical projection systems in particular, considerable mechanical complexity has been encountered in order to provide for a light source behind the film and means for receiving and projecting the film image onto the screen of an associated viewer. The complexity often comprises mechanical hinge and spring assemblies internal to the structure of the viewer to permit movement of the optics and light projection means during insertion of the cartridge which increases the cost of the viewer and permits greater opportunity for mechanical failures.

SUMMARY OF THE DESCRIPTION

The present invention is directed to sound and optical reproduction systems in general and, in particular, to a simplified side-loading continuous loop film cartridge for use in a film viewer wherein the optics are located in or project from the viewer and the film and prism drive mechanism is located in the cartridge. The cartridge can be molded or die cast in as few as two pieces to reduce to only one or two the number of required moveable parts in the entire system.

In accordance with a principle object of the invention, there is provided a film strip viewer which contains a light source, a prism rotatable in synchronism with the film, associated projecting mirrors and a viewing screen, and a film cartridge adapted to be releasably mounted on the side of the viewer.

The cartridge comprises a stator and a rotor to form an integral two piece film container. The stator is provided with appropriate recesses for receiving those optical components of the viewer which project outwardly from the side of the viewer. The rotor is adapted to be rotatably coupled to the stator and is provided with a set of gear teeth for engaging and moving the film past an aperture in a centrally disposed interior surface of the stator and a set of sprockets for receiving associated aligning and driving gear teeth on the prism. The internal film passageways and the associated film drive in the stator and rotor combine to permit movement of the film in either a forward or reverse direction by manual or motor driven means. A feature of the central location of the film and prism drive gear and sprockets is to permit the use of various diameter cartridges of relatively unlimited film capacity.

These and other features as well as advantages of the present invention will be more apparent in the following detailed description and accompanying drawings in which:

FIG. 1 is a perspective view of the viewer and cartridge of the present invention.

FIG. 2 is partial plan view of the optical path of the viewer of FIG. 1 with the cartridge removed.

FIG. 3 is an elevation view of FIG. 2.

DETAILED DESCRIPTION OF THE INVENTION

Figure 4:
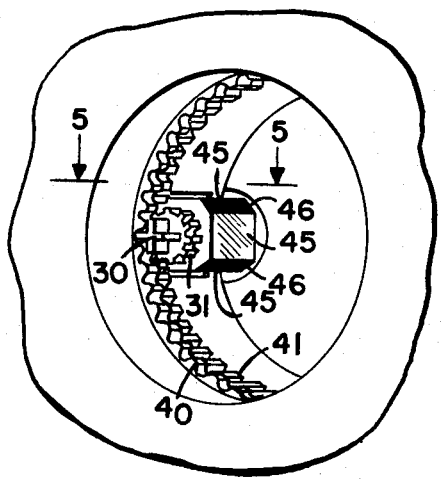
FIG. 4 is a partial perspective view of the prism and drive gear and rotor sprocket assembly of the present invention.

As indicated generally in FIG. 1, there is shown in combination a viewer 1 and side-loading film cartridge 2 in accordance with the present invention. Viewer 1 is provided with a viewing screen 3 which is preferably frosted glass to permit viewing a desired film by means of conventional back-illumination projection techniques. A housing 4, indicated generally, retains screen 3 in a vertical position and serves also to contain the optics of the projection system hereinafter described in more detail with respect to FIG. 2. Housing 4 and cartridge 2 is preferably inexpensive molded high-impact plastic, but may be made from any material suitable, for example, for academic, industrial or home use. They may also be die cast.

The optics in the illustrated embodiment shown in FIG. 2 comprise a light source 10 and first lens 11 for generating a light beam 12 which propagates along a path as indicated by arrows. The beam 12 is directed through an aperture 13 in an internal wall of housing 4 to a first corner mirror 14, through a rotatable prism 15, indicated generally, and a second lens 16 to a second corner mirror 17. From corner mirror 17, the beam is directed to a third corner mirror 18, to a mirror 19 and finally to screen 3. The first and second corner mirrors 14 and 17, are supported in triangularly shaped members 20, 21, respectively, of housing 4 which projects from the side of viewer 1. Second lens 16 is supported as indicated generally in a cylindrical shaped member 22 of housing 4 which also projects from the side of viewer 1 between members 20, 21. Cylindrically shaped member 22 is provided with a detent 23 which is adapted to be engaged by a corresponding raised rim on cartridge 2 to serve as a pop-joint for easy insertion and removal of cartridge 2 from viewer 1. Triangular shaped members 20, 21 of housing 4 serve also as keying members for cartridge 2 to insure proper insertion and alignment of cartridge 2 when it is placed in viewer 1. Space is provided between members 20 and 22 for a section of a film 25 to lay in the path of beam 12 between corner mirror 20 and prism 15 when cartridge 2 is in place.

As shown in more detail in FIGS. 2–5, prism 15, as is conventional, is provided with 4 orthogonal transparent faces 45 and four opaque corner surfaces 46. In operation, prism 15 is caused to rotate in synchronism with the movement of film 25 so as to always present a clear face parallel with film 25 when a frame of film 25 is centered in the light beam. At all other times, the opaque surfaces 46 of prism 15 intercept the light to prevent picture flicker as successive frames of film 25 are viewed. To insure synchronism with the movement of film 25, prism 15 is further provided with two sets of gear teeth 30, 31. Teeth 30, 31 correspond to and are adapted to engage, respectively, a pair of sprockets 40, 41 located on an inner surface of cartridge 2. To insure proper initial alignment of prism 15 with the film 25 when the viewer is loaded with cartridge 2, one each of teeth 30 are aligned with one of the faces 45 of prism 15. Since there are only four faces 45, there are only four teeth 30. It is understood, however, that prism 15 need not be limited to four faces. Since the film drive gear is also in cartridge 2 as described below, there is already mechanical alignment between the film drive gear and the sprockets 40, 41 and hence alignment with the prism during operation.

Figure 6:
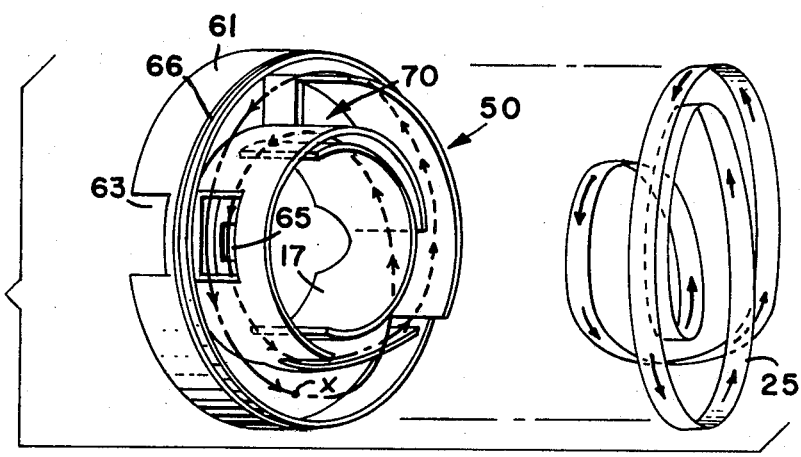
FIG. 6 is an exploded perspective view of the film passageways of the cartridge of the present invention.
Figure 7:
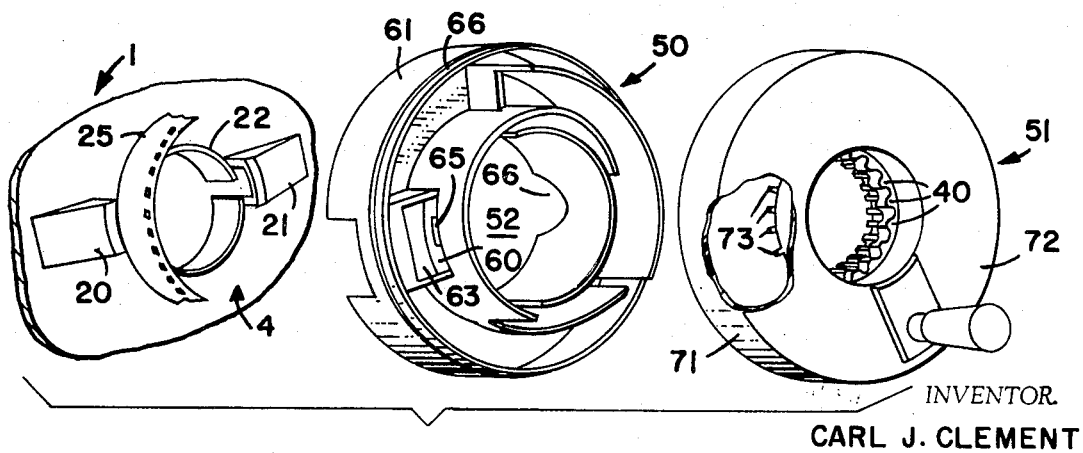
FIG. 7 is an exploded partial view of the cartridge and view of the present invention.
Figure 8:
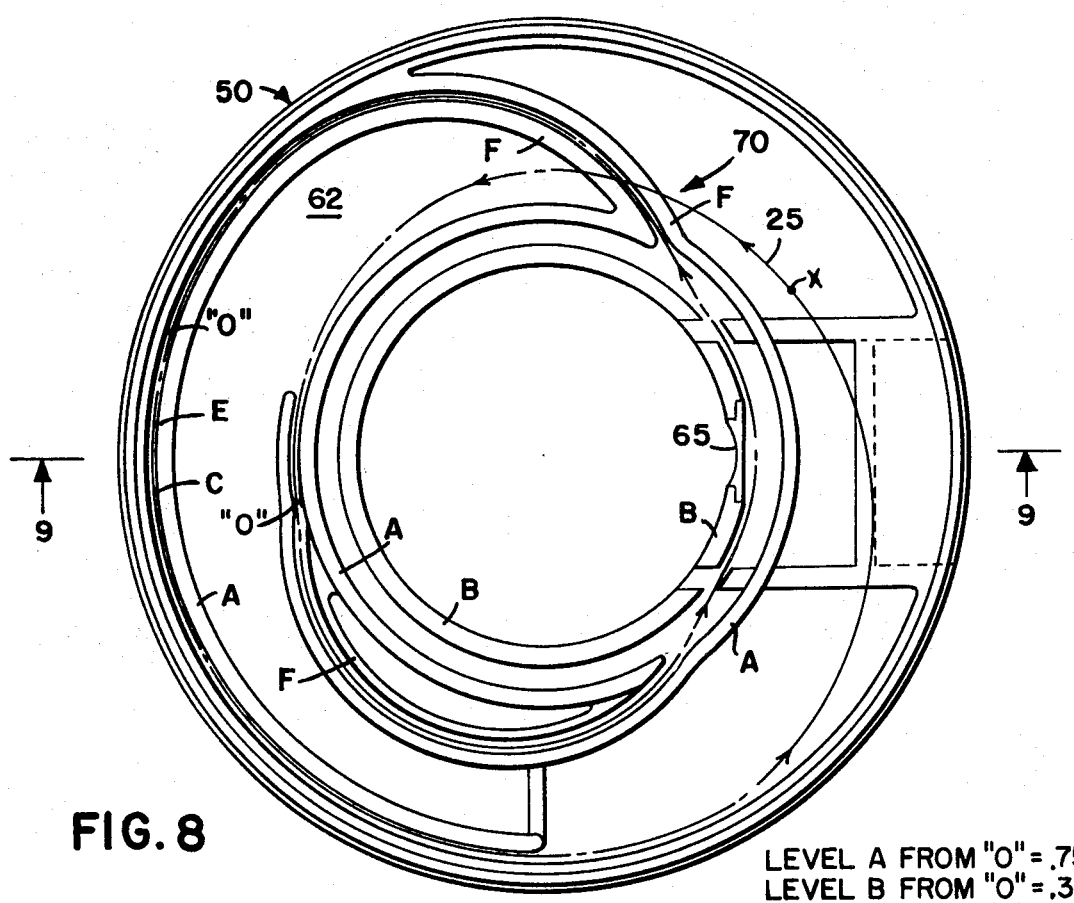
FIG. 8 is a plan view of the film passageways in the cartridge of the present invention.

As shown in FIGS. 6 and 7, film cartridge 2, as indicated generally, comprises a stator 50, a rotor 51 and a film passageway 70 for guiding the movement of the continuous loop film 25 past a film aperture 65.

As shown in more detail in FIG. 7, with passageway 70 omitted for clarity, stator 50 of film cartridge 2 forms a toroid in that it is formed from two shallow concentric cylinders serving as an interior side wall 60 and an exterior side wall 61 to an end wall 62 between them and an axially disposed cylindrical open area 52 for receiving the cylindrical member 22 projected from the side of view 1. A raised rim serves to engage detent 23 on projected member 22 to form the pop-joint between cartridge 2 and viewer 1 as above described with respect to FIG. 2. On opposing sides of stator 50, there is provided in end wall 62 a recess 63 for receiving triangularly shaped member 20 and a recess 64 for receiving triangularly shaped member 21. Much of recesses 63 and 64 are omitted from FIG. 6 for clarity, as are the actual relative heights of the various portions of passageway 70 hereinafter described with respect to FIGS. 9 and 10. It is understood, however, that film passageway 70 is made to clear recesses 63 and 64. Opposing sections between recesses 63 and 64 of interior side wall 60 are cut away to provide a film aperture 65 and beam aperture 66. Recess 63 is cut away from interior side wall 60 on both sides of film aperture 65 to provide a passageway for the section of film 25 to be viewed through film aperture 65.

Figure 5:
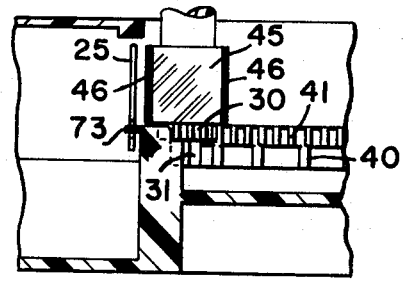
FIG. 5 is a partial plan view of the rotor film drive gear of FIG. 3 and the prism drive gear and sprocket assembly taken along lines 5—5 in FIG. 4.

Rotor 51 also forms a toroid in that two shallow cylinders serve, respectively, as an interior side wall 70 and an exterior side wall 71 to an end wall 72. As seen in FIGS. 5 and 7, sprockets 40, 41, described above, are disposed about the edge of the exterior surface of interior side wall 70 so as to permit engagement with teeth 30, 31 on prism 15.

A set of gear teeth 73 for engaging and moving film 25 past film aperture 65 is disposed about the interior surface of interior side wall 70.

Figure 9:
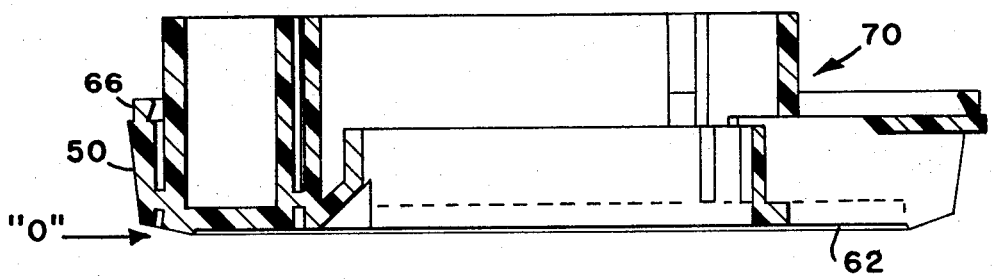
FIG. 9 is an elevation view taken along lines 9—9 in FIG. 8.

Referring now to FIGS. 6, 9 and 10, it can be seen that film passageway 70 in stator 50 is formed by a series of arcuate surfaces A, B and F of varying heights and slightly decreasing radii as viewed in a counterclockwise direction. It will be understood that the main coil of the film is not shown in the exploded view of film 25 in FIG. 6 to illustrate with more clarity the relationship between the inner and outer coils of film 25. The floor of the passageway 70 is formed in part by end wall 62 and by a number of molded ramps, C and E, which guide the section of film to be viewed away form and toward aperture 65 and the main coil of film 25. Relative to a point O, the height of surfaces and ramps A, B, C, E and F are, respectively, 0.750, 0.335, 0.168, 0.089, 0.395. With the film moving in a generally counterclockwise direction and tracing its path from a point X in the direction of the arrow heads, the film 25 describes a generally downward path from the inner coil of the main coil of film 25 toward the surface of end wall 62 and past film aperture 65. Once past film aperture 65, film 25 is guided outwardly and generally upwardly away from end wall 62 to form the outer coil of the main coil of film 25.

With film aperture 65 and optics including prism 15 centrally disposed with respect to cartridge 2, the diameter of and number of feet of film which can be carried in cartridge 2 is virtually unrestricted.

In practice, a continuous loop of film is placed in the passageway 70 of stator 50 as described above. Rotor 51 is then snapped onto stator 50 and rotatably retained thereon by means of a conventional pop-joint detent 66. If necessary, a slight amount of relative motion between the rotor 51 and stator 50 will cause the rotor teeth 73 to engage corresponding sprocket holes in film 25. As is conventional, one of sprocket holes is aligned with each frame of film 25. Since teeth 73 are mechanically coupled to prism engaging sprockets 40, 41 on the interior side wall 70 of rotor 51, there is always alignment between film sprocket holes and prism engaging sprockets 40, 41. However, prism gear teeth 31 are not necessarily in proper position when a cartridge 2 is inserted on viewer 1. To provide the required initial alignment, aligning prism gear teeth 30 are provided to insure a prism face 45 and a frame of film 25 will be aligned.

As mentioned previously, each tooth of teeth 30 is aligned with a face of prism 15. The corresponding spaces in sprocket 40 on rotor 51 are widely spaced to facilitate capture and force prism 15 to rotate roughly into proper position. An additional slight amount of motion will facilitate engagement of prism gear teeth 31 with their corresponding spaces in sprocket 41 and prism 15 will be aligned with film 25 to provide synchronized movement of prism 15 with film 25 for eliminating picture flicker.

Accordingly, it will be seen that in operation, as rotor 51 is moved relative to stator 50, the film and prism will be moved in synchronism by means of a single moveable member, namely rotor 50. The rotor 50 may be driven in either direction manually by means of a handle 75 or by any suitable electric motor coupled, for example, to the interior end of the shaft of prism 15.

It will be appreciated that cartridge 2, while illustrated with a viewer, may also be used with a camera resulting in equivalent simplification and increased reliability of the camera. It is believed that film development within the cartridge, whereby the film need not be removed from the cartridge for development, is feasible and would greatly reduce film handling and packaging problems.

In a camera, the optical path and lens assembly can be arranged in a conventional manner similar to that described above with respect to the viewer. The viewing screen 3 would be changed to a lens and film 25 would comprise unexposed film.

In a sound projection or reproduction system, the prism 15 with its associated drive gears 30 and 31 would be replaced, for example, by a magnetic head suitable for recording or sensing signals. The film 25 would comprise, for example, a magnetic tape suitable for receiving and retaining such signals. The magnetic head could be further provided with means to engage the tape such as a drive wheel for driving the tape at any desired speed within the cartridge as by means of a motor.

What is claimed is:

1. A film viewer comprising, a film projector having a body with an aperture for receiving a film cartridge, a viewable screen mounted in said body, optical means for illuminating the screen including a rotating prism positioned for directing illumination onto said screen, said prism having a base, and first gear teeth means and a film cartridge insertable in the aperture of said body and having, a. a rotor member which is rotatable with respect to said body, including second gear teeth means for engaging said first gear teeth means thereby rotating said prism, and b. a stator member stationary with respect to said body and defining an internal closed loop film path for supporting film, said stator means having a cutout section for transmitting illumination to the screen through the film said stator being nested within said rotor member.

2. The apparatus of claim 1 wherein said rotor member includes third gear teeth means for advancing film.

* * * * *